United States Patent
Kennedy et al.

(10) Patent No.: US 8,225,306 B2
(45) Date of Patent: Jul. 17, 2012

(54) PLATFORM INDEPENDENT IMAGING METHOD AND SYSTEM

(75) Inventors: Michael Kennedy, Round Rock, TX (US); Don Cannon, Austin, TX (US); Richard D. Burney, Pflugerville, TX (US)

(73) Assignee: Dell Products L.P., Austin, TX (US)

( * ) Notice: Subject to any disclaimer, the term of this patent is extended or adjusted under 35 U.S.C. 154(b) by 2725 days.

(21) Appl. No.: 10/317,871

(22) Filed: Dec. 12, 2002

(65) Prior Publication Data

US 2004/0117338 A1    Jun. 17, 2004

(51) Int. Cl.
G06F 9/445 (2006.01)
(52) U.S. Cl. ......................................... 717/174
(58) Field of Classification Search ............. 719/327
See application file for complete search history.

(56) References Cited

U.S. PATENT DOCUMENTS

| | | | | |
|---|---|---|---|---|
| 5,481,714 A | | 1/1996 | Pipkin et al. ............. | 395/700 |
| 5,966,540 A | | 10/1999 | Lister et al. ............... | 395/712 |
| 6,202,147 B1 | * | 3/2001 | Slaughter et al. ......... | 713/1 |
| 6,421,777 B1 | | 7/2002 | Pierre-Louis et al. ..... | 713/2 |
| 6,487,522 B1 | * | 11/2002 | Smith et al. ............... | 702/186 |
| 6,513,159 B1 | * | 1/2003 | Dodson ...................... | 717/178 |
| 6,804,774 B1 | * | 10/2004 | Larvoire et al. ........... | 713/2 |
| 6,938,250 B2 | * | 8/2005 | Cohen et al. .............. | 717/178 |
| 6,944,867 B2 | * | 9/2005 | Cheston et al. ........... | 719/327 |
| 7,062,672 B2 | * | 6/2006 | Owhadi et al. ............ | 714/6.1 |
| 7,219,344 B2 | * | 5/2007 | Chenelle et al. .......... | 717/177 |
| 2002/0147972 A1 | * | 10/2002 | Olmeda et al. ........... | 717/174 |
| 2003/0023829 A1 | * | 1/2003 | Ishii ........................... | 711/219 |
| 2003/0023839 A1 | * | 1/2003 | Burkhardt et al. ......... | 713/1 |
| 2003/0204842 A1 | * | 10/2003 | Chenelle et al. .......... | 717/177 |
| 2004/0006688 A1 | * | 1/2004 | Pike et al. .................. | 717/174 |

OTHER PUBLICATIONS

"How to use Syspret in Factor Mode", Microsoft TechNet, Nov. 29, 2001.*

* cited by examiner

*Primary Examiner* — Chat Do
*Assistant Examiner* — Jue Wang
(74) *Attorney, Agent, or Firm* — Hamilton & Terrile, LLP; Robert W. Holland

(57) ABSTRACT

A method and system for defining a platform independent image on a medium readable by an information handling system determines a core operating system, enterprise configurations and a driver file for each of plural platform model types with one or more installation functions operable to install the enterprise configurations in an operating system of an information handling system having one of the plural platform model types. The installation function determines the platform model type of an information handling system loaded with the platform independent image and configures the core operating system with the enterprise configurations and a driver file associated with the determined platform model type.

17 Claims, 4 Drawing Sheets

PLATFORM INDEPENDENT IMAGING METHOD AND SYSTEM

BACKGROUND OF THE INVENTION

1. Field of the Invention

The present invention relates in general to the field of information handling system configurations, and more particularly relates to a platform independent imaging method and system for configuring software of an information handling system platform.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The wide variety of hardware platforms and software configurations available for information handling systems provides business enterprises with great flexibility to purchase information handling systems adapted to handle desired functions. However, the use of varied hardware platforms and software configurations typically introduces complexity to the purchase and maintenance of information handling systems for an enterprise. For instance, a business enterprise often orders information handling systems over a time period resulting in the purchase of a variety of hardware platform configurations. Thus, a business enterprise often must attempt to maintain a uniform operating system and a set of uniform applications on different hardware platforms. As an example, a business enterprise typically maintains a predetermined version of WINDOWS and commonly-used enterprise applications for word processing and other functions, such as WORD and EXPLORER, on platforms with different processors, memory and peripherals, such as monitors and printers.

In order to configure information handling systems with consistent operating system and application loads for an enterprise customer, information handling system manufacturers typically load images with the desired configuration on a manufactured information handling system. An alternative to the use of an image is the use of an unattended installation, which loads a defined software configuration from an installation share point. In the event that difficulties arise after the information handling system is delivered, the business enterprise may re-install the software configuration by using the image or unattended installation used by the manufacturer.

One difficulty with maintaining a uniform software configuration for a business enterprise is that the image and unattended installation techniques for loading a software configuration lack the flexibility and reliability for re-installation across a wide variety of platforms of a business enterprise. Image installations are generally fast, simple and static, however, image installations generally require one image for each target platform and are inflexible in that any software configuration changes generally require the creation of a new image. In addition, transitions to new platforms usually require the creation of a new image with image management for multiple different platforms prone to expensive mistakes. Unattended installations are flexible and extendable in the support of multiple target platforms from a single installation share point, with new platforms added without effecting existing loads. New platforms are supported by unattended installations by adding new drivers and, if all target platforms need a similar change, a single modification to the installation share point will accommodate the change. However, unattended installations are generally difficult to create and modify and have a slow installation speed, often in excess of an hour, that typically precludes information handling system manufacturers from the use of unattended installations.

SUMMARY OF THE INVENTION

Therefore a need has arisen for a system and method which self-configures an information handling system independent of target platform hardware configuration.

A further need exists for a system and method which installs a software configuration in a flexible and rapid manner for use in information handling system manufacturing and in management of purchased information handling system software configurations.

In accordance with the present invention, a system and method are provided which substantially reduce the disadvantages and problems associated with previous systems and methods for loading a desired software configuration on plural platform types. A platform independent image provides an enterprise software configuration on plural types of platform model types with modular components that simplify the management of modifications to the enterprise software configuration and the type of platform model types that accept the image.

More specifically, a platform independent image is defined to install an enterprise software configuration on an information handling system having a hardware configuration platform from a set of platform model types. The platform independent image includes a core image having a hardware neutral operating system, customer enterprise customizations and enterprise applications, a set of platform driver files with a driver file for each platform model type, and an installation module with instructions for installing the enterprise software configuration on an information handling system. Upon boot of an information handling system having the platform independent image, the installation module determines the platform model type and populates the operating system with the driver file associated with the platform model type. In one embodiment, non-platform model drivers are configured to support third party hardware devices added to the information handling system platform. In another embodiment, Hardware Abstraction Layer settings of the platform independent image are set to a lowest common denominator of the platform models and then updated to match the determined platform model type during installation of the enterprise software configuration. Changes to supported platform model types are made by adding or removing a driver file for each model type added or removed. Changes to the scripting of operating system and drivers for installation of an enterprise software configuration are made by updating the appropriate module of the platform independent image.

The present invention provides a number of important technical advantages. One example of an important technical advantage is that the platform independent image self-configures an information handling system independent of target platform hardware configuration. Plural hardware platforms are supported by saving a driver file for each hardware platform on the platform independent image and populating a hardware neutral operating system with an appropriate driver file based on discovery of the platform type at installation. In this manner, a single image may support configuration of software on information handling systems for an enterprise, both at manufacture of new information handling systems and reinstallation of a software configuration on an information handling system deployed to the enterprise. For instance the same image configures desktops or laptops of different model types by supporting each model type with a driver file.

Another example of an important technical advantage is that the platform independent image installs a desired enterprise software configuration in a flexible and rapid manner for use in information handling system manufacturing and in management of purchased information handling system software configurations. An enterprise coordinates with a manufacturer to establish a desired software configuration for the enterprise. The manufacturer and enterprise use the platform independent image to configure a defined set of supported platforms with a desired operating system and applications. Modifications to the type of platforms supported or the enterprise software configuration are made by updating appropriate modules of the platform independent image to provide flexibility in configuration management. In addition, the platform independent image provides a relatively rapid installation of approximately eight minutes compared with installation times in excess of an hour for unattended installations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In order to aid in the management of an enterprise software configuration across plural information handling system hardware platforms, the present invention provides a platform independent image that supports installation and reinstallation of the enterprise software configuration in plural information handling system platform types. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
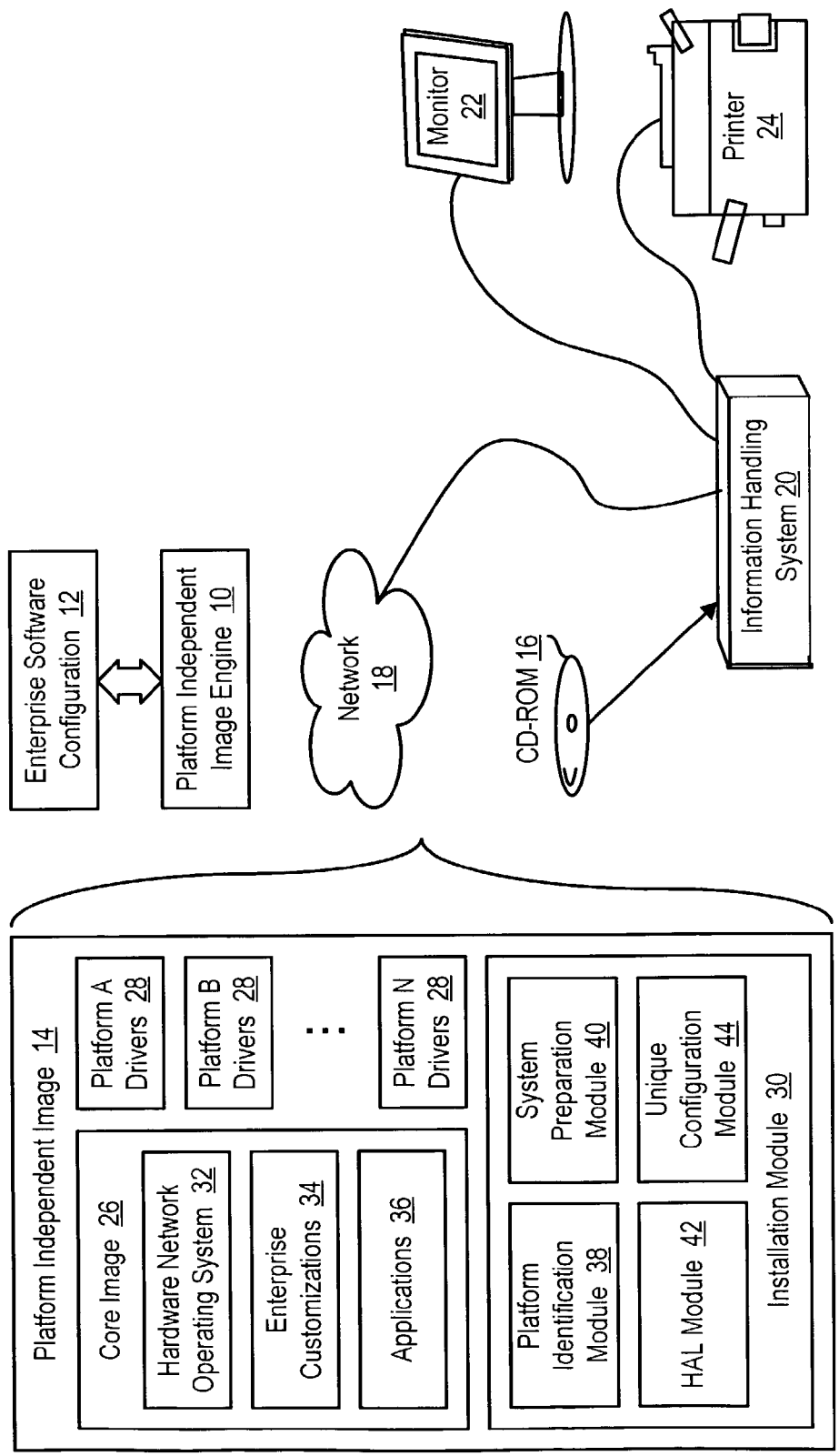
FIG. 1 depicts a block diagram of a system for creating and deploying a platform independent image.

Referring now to FIG. 1, a block diagram depicts a system for creating and deploying a platform independent image. A platform independent image engine 10 analyzes an enterprise software configuration 12 and generates a platform independent image 14 stored on a medium such as a CD-ROM 16 or network 18. Platform independent image 14 is copied to an information handling system 20 having one of a set of defined hardware platforms identified by platform model type. Platform independent image 14 identifies the platform model type and configures information handling system 20 with drivers associated with the model type as well as with non-model type drivers associated with other hardware of information handling system 20, such as post-purchase hardware installations and peripheral devices like monitor 22 and printer 24.

Platform independent image 14 has a modular architecture with a core image 26 that defines a software configuration for an enterprise, a set of platform drivers 28 that provide drivers for associated platform model types and an installation module 30 that provides intelligence for the self-configuration of an information handling system having the image. Core image 26 includes a hardware neutral operating system 32, enterprise customizations 34 and enterprise applications 36 that define the software configuration for an enterprise. For instance, platform independent image engine 10 analyzes an information handling system configured as desired by an enterprise, and creates core image 26 by identifying, saving and removing configuration uniqueness as enterprise customizations 34, saving a driverless operating system as hardware neutral operating system 32, and saving enterprise-common applications 36 such as word processing, anti-virus, browser and other commonly deployed applications. Each platform driver file 28 includes drivers deployed to an associated platform model type so that platform independent image 14 is easily adapted to support new platforms by adding a new driver file 28 for each new platform. Installation module 30 includes a platform identification module 38 that determines the platform model type of an information handling system having platform independent image 14, provides the associated driver file 28 for system preparation module 40 to configure the operating system, and removes the remaining platform driver files 28. A Hardware Abstraction Layer module 42 determines if a Hardware Abstraction Layer exists and establishes updated settings for the Hardware Abstraction Layer. A unique configuration module 44 applies the enterprise customizations 34 to the operating system and applications to complete installation of the enterprise configuration on a target platform.

Figure 2:
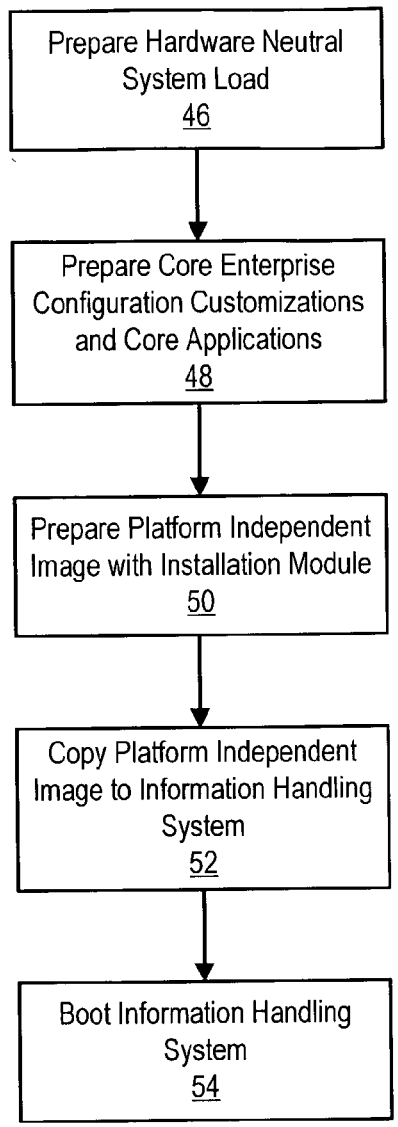
FIG. 2 depicts a flow diagram for creating and deploying a platform independent image.

Referring now to FIG. 2, a flow diagram depicts a process for creating and deploying a platform independent image. At step 46, a core image hardware neutral operating system load is prepared from an information handling system configured with the desired enterprise software configuration. For instance, a desired version of WINDOWS deployed by the enterprise is copied without drivers for platform and non-platform model type hardware. At step 48, core image enterprise configuration customizations and applications are prepared from the enterprise-configured information handling system. The configuration uniqueness of the enterprise software configuration are identified and saved for re-application. At step 50, the platform independent image is prepared with the core image operating system, enterprise configuration customizations and applications, the platform model type drivers and the installation module to provide installation intelligence. At step 52, the platform independent image is copied to an information handling system for installation of the enterprise software configuration, and at step 54 the information handling system is booted to initiate installation of the software configuration with the installation module. Platform independent image 14 may be copied to a newly manufactured information handling system for initial installation of the enterprise software configuration or may be copied to a deployed enterprise information handling system to reinstall or update the enterprise software configuration. Updates to the enterprise software configuration are managed by updating an appropriate module, such as adding a new platform driver file, adding a new or modified enterprise customization or application.

Figure 3:
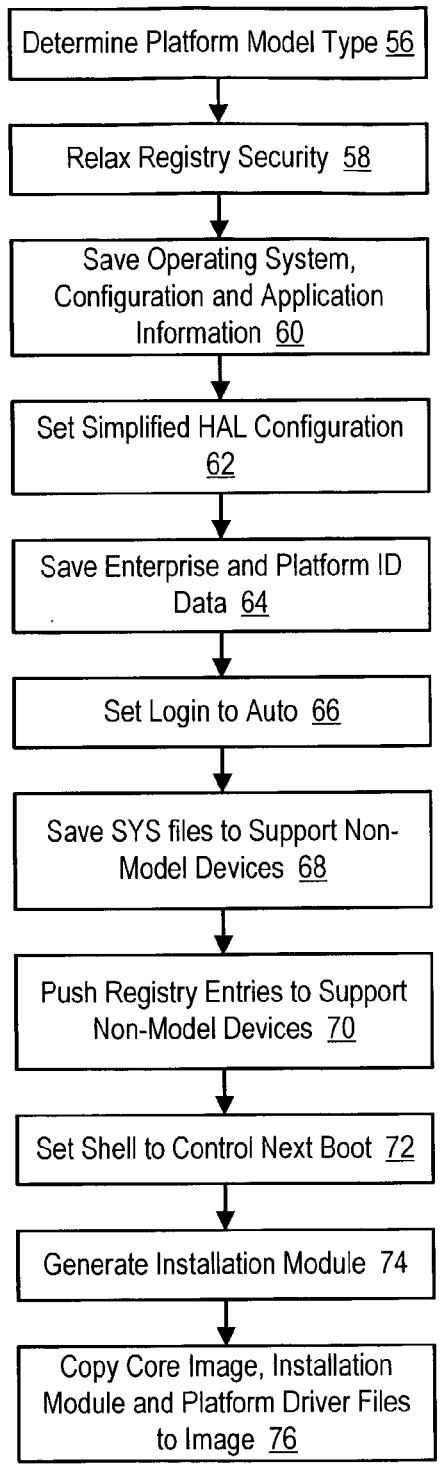
FIG. 3 depicts a flow diagram for creating a platform independent image.

Referring now to FIG. 3, a flow diagram depicts a process for creating a platform independent image from an information handling system having the enterprise software configuration. The process starts at step 56 with a determination of the platform model type on which the enterprise software configuration is loaded. At step 58, the registry security is relaxed for the information handling system to allow access to the registry settings and analysis of the enterprise software configuration for the determined platform model type. At step 60, the operating system is saved without driver registry settings and the configuration uniqueness and applications for the enterprise configuration are identified and saved.

Starting at step 62, the functions of installation module 30 are defined. At step 62, if a Hardware Abstraction Layer ("HAL") exists for high performance and/or multiprocessor usage, the existing Hardware Abstraction Layer settings are simplified to a lowest common denominator setting to ensure backwards compatibility for all existing platform model types that include Hardware Abstraction Layer functionality. At step 64, enterprise and platform identification data are saved, such as user-required variables like machine naming and domain joining. At step 66, the operating system login setting is set to auto for initiating boot at power-up of an information handling system having the platform independent image. At step 68, the SYS files for supporting non-platform model type devices, such as third party hardware and peripheral devices, are saved and, at step 70 the registry entries for supporting the non-platform model type devices are pushed to the enterprise customizations. At step 72, the Shell is set to control the next boot of an information handling system having the platform independent image and, at step 74 the installation module is generated. At step 76, the core image, platform drivers for all applicable platform model types and the installation module are copied to form the platform independent image.

Figure 4:
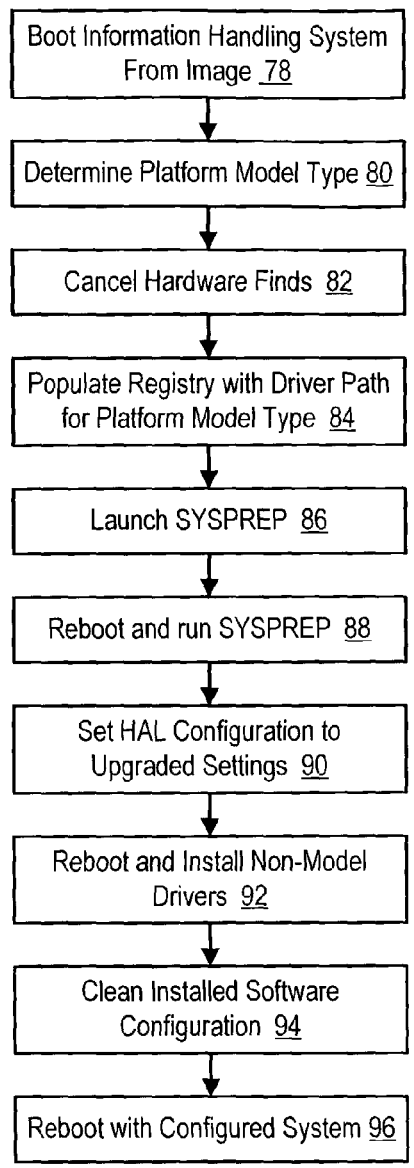
FIG. 4 depicts a flow diagram for configuring an information handling system with a platform independent image.

Referring now to FIG. 4, a flow diagram depicts a process for configuring an information handling system with a platform independent image copied to the information handling system's hard disk drive from a storage medium. At step 78, the information handling system is booted from the image. At step 80, the installation module determines the platform model type of the information handling system on which the platform independent image is installed and, at step 82, cancels automatic hardware find functions of the operating system, such as plug-and-play functions. At step 84, the installation module populates the operating system registry with the driver path for the driver file associated with the determined platform model type and, at step 86 launches a system preparation function, such as the SYSPREP function of the WINDOWS operating system, to initiate installation of the drivers. At step 88, the information handling system is rebooted to run the system preparation function for loading the drivers associated with the determined platform model type into the information handling system operating system. At step 90, the Hardware Abstraction Layer settings are detected and upgraded to settings appropriate for the enterprise software configuration. At step 92, the information handling system is re-booted and non-platform model drivers are installed to support hardware configurations of third party or peripheral devices added to the information handling system platform by the enterprise. At step 94, the installed software configuration is cleaned, such as by deleting unused platform driver files, and at step 96 the information handling system is re-booted to have the enterprise software configuration installation completed and operational.

The platform independent image simplifies the scripting of operating system and driver settings for an enterprise by allowing the configuration of a new or existing information handling system with enterprise software from a single share point installation regardless of the hardware configuration of the target platform. The target software configuration is performed in a rapid manner from an image transferred to the information handling system and works on any platform having a driver file defined in the image. In addition to rapid installation from a single image, the platform independent image also offers ease of management through a modular design that updates an enterprise software configuration by updating the module associated with changes to the enterprise software configuration. An enterprise manages a consistent software configuration across different types of platforms and more easily coordinates with information handling system manufacturers for ordering new information handling systems with the desired software configuration, even as new platform model types are designed and produced.

Although the present invention has been described in detail, it should be understood that various changes, substitutions and alterations can be made hereto without departing from the spirit and scope of the invention as defined by the appended claims.

What is claimed is:

1. A method for generating an information handling system platform-independent image operable to load an enterprise configuration on plural platform model types, the method comprising:

building a core operating system;

defining enterprise configurations;

defining a driver file for each of the plural platform model types;

defining one or more installation functions operable to install the enterprise configuration on an information handling system having one of the plural platform model types;

saving the core operating system, enterprise configurations, driver files and installation functions as a platform independent image, the installation function operable at a boot of an information handling system to determine the platform model type and to select the driver file associated with the platform model type;

defining non-platform model type drivers associated with the enterprise configuration;

defining an installation function operable to load non-platform model type drivers on a platform model type information handling system; and saving the non-platform model type drivers and installation function to the platform independent image.

2. The method of claim 1 further comprising:

identifying a Hardware Abstraction Layer associated with the enterprise configuration; and setting a simplified Hardware Abstraction Layer configuration for loading to the platform independent image.

3. The method of claim 1 wherein an installation function comprises a system preparation module operable to run SYSPREP to prepare the information handling system to operate with the drivers of the identified platform model type.

4. The method of claim 1 wherein an installation function comprises a platform model type discovery module operable to detect the platform model type of an information handling system and to remove driver files from the information handling system that are not associated with the detected platform model type.

5. The method of claim 1 further comprising:

copying the platform independent image to an information handling system hard disk drive, the information handling system having a platform model type; and booting the information handling system to call the installation functions for installing the enterprise configuration on the information handling system platform model type.

6. The method of claim 5 wherein copying the platform independent image further comprises copying the image by a manufacturer to a manufactured information handling system for initial installation of the enterprise configuration.

7. The method of claim 5 wherein copying the platform independent image further comprises copying the image to an enterprise operated information handling system to reinstall the enterprise configuration.

8. A system for generating an information handling system platform-independent image from an information handling system having an enterprise configuration, the system comprising:

a processor;

a storage medium;

a platform independent image engine having instructions operable to run on the processor to:

build a core operating system;

define enterprise configurations;

define a driver file for each of plural platform model types;

define one or more installation functions operable to install the enterprise configuration on an information handling system having one of the plural platform model types;

save the core operating system, enterprise configurations, driver files and installation functions in the storage medium as a platform independent image, the installation function operable at a boot of an information handling system to determine the platform model type and to select the driver file associated with the platform model type;

define non-platform model type drivers associated with the enterprise configurations;

define an installation function operable to load non-platform model type drivers on a platform model type information handling system; and save the non-platform model type drivers and installation function to the platform independent image.

9. The system of claim 8 wherein the instructions are further operable to transfer the platform independent image to an information handling system having a platform model type for initial installation of the enterprise configuration on the information handling system.

10. The system of claim 8 wherein the instructions are further operable to transfer the platform independent image to an information handling system having a platform model type for reinstallation of the enterprise configuration on the information handling system.

11. The system of claim 8 wherein the instructions are further operable to define an installation function that removes the driver files of a platform independent image other than the driver file associated with the determined platform model type.

12. A method for installing a predetermined software configuration on an information handling system having one of plural information handling system model types, the method comprising:

copying an image to the information handling system;

booting the information handling system from the image;

calling a platform identification module from the image to determine the information handling system platform type;

selecting a driver file associated with the determined information handling system platform type from plural driver files of the image, each of the plural driver files associated with an information handling system platform type;

configuring the information handling system with the drivers of the selected driver file;

selecting one or more non-platform type drivers; and installing the non-platform type drivers on the information handling system.

13. The method of claim 12 further comprising deleting driver files not associated with the determined information handling system type.

14. The method of claim 12 further comprising:

detecting simplified Hardware Abstraction Layer configuration settings; and resetting the simplified settings to upgraded Hardware Abstraction Layer configuration settings.

15. A non-transitory medium readable by an information handling system, the non-transitory medium storing a platform independent image comprising:

a core image defining an enterprise software configuration;

plural platform driver files, each platform driver file associated with an information handling system platform model type; and an installation module operable to determine the platform model type of an information handling system and to configure the enterprise software configuration with the driver file associated with the determined platform model type;

wherein the installation module further comprises a unique configuration module operable to detect a unique configuration having non-platform model type drivers and to load the non-platform model type drivers on the information handling system.

16. The non-transitory medium of claim 15 wherein the core image further comprises:

a hardware neutral operating system;

enterprise customizations; and enterprise applications.

17. The non-transitory medium of claim 15 wherein the installation module further comprises a Hardware Abstraction Layer module operable to detect a simplified Hardware Abstraction Layer configuration and to reset the simplified configuration to an upgraded Hardware Abstraction Layer configuration.

* * * * *